US010625901B2

(12) United States Patent
Martini et al.

(10) Patent No.: US 10,625,901 B2
(45) Date of Patent: *Apr. 21, 2020

(54) OPENING DEVICE FOR A CONTAINER AND A METHOD FOR PRODUCING SUCH OPENING DEVICE

(71) Applicant: TETRA LAVAL HOLDINGS & FINANCE S.A., Pully (CH)

(72) Inventors: Pietro Martini, Parma (IT); Livio Veronesi, San Felice sul Panaro (IT); Giulio Bertani, Carpi (IT); Davide Morciano, Modena (IT)

(73) Assignee: TETRA LAVAL HOLDINGS & FINANCE S.A., Pully (CH)

(*) Notice: Subject to any disclaimer, the term of this patent is extended or adjusted under 35 U.S.C. 154(b) by 2 days.

This patent is subject to a terminal disclaimer.

(21) Appl. No.: 16/046,014

(22) Filed: Jul. 26, 2018

(65) Prior Publication Data

US 2018/0327136 A1 Nov. 15, 2018

Related U.S. Application Data

(63) Continuation of application No. 15/107,695, filed as application No. PCT/EP2014/075472 on Nov. 25, 2014, now Pat. No. 10,040,597.

(30) Foreign Application Priority Data

Dec. 23, 2013 (EP) .................................... 13199500

(51) Int. Cl.
*B65D 5/74* (2006.01)
*B65D 53/04* (2006.01)
*B65D 47/12* (2006.01)

(52) U.S. Cl.
CPC ............. *B65D 5/747* (2013.01); *B65D 5/749* (2013.01); *B65D 47/122* (2013.01); *B65D 53/04* (2013.01);
(Continued)

(58) Field of Classification Search
CPC ...... B65D 5/747; B65D 5/749; B65D 47/122; B65D 53/04; B65D 2251/02;
(Continued)

(56) References Cited

U.S. PATENT DOCUMENTS 4,588,099 A 5/1986 Diez
4,813,578 A 3/1989 Gordon et al.
(Continued)

FOREIGN PATENT DOCUMENTS

EP 1 627 819 A1 2/2006
EP 1 352 840 B1 11/2008
(Continued)

OTHER PUBLICATIONS

International Search Report (PCT/ISA/210) dated Feb. 12, 2015, by the Japanese Patent Office as the International Searching Authority for International Application No. PCT/EP2014/075472.
(Continued)

*Primary Examiner* — Patrick M. Buechner
(74) *Attorney, Agent, or Firm* — Buchanan Ingersoll & Rooney PC

(57) ABSTRACT

An opening device for a container comprises a pouring spout defining a pouring opening to pour in use the content of the container, a closing element closing the pouring opening and connected to the pouring spout by a breakable connection, and a closure fitted to the pouring spout in a removable manner to close the pouring opening at a region thereof different from that closed by the closing element; the closing element is formed in one piece with a protruding portion
(Continued)

extending through the pouring opening and welded to the closure far away from the closing element.

17 Claims, 4 Drawing Sheets

(52) U.S. Cl.
CPC .... *B65D 2251/02* (2013.01); *B65D 2251/023* (2013.01)

(58) Field of Classification Search
CPC .............. B65D 2251/023; B65D 47/36; B65D 77/067; B65D 17/12; B65D 17/166; B65D 41/20; B65D 41/50; B65D 43/02; B65D 43/0225; B65D 43/0277; B65D 51/20; B65D 51/22; B65D 51/222
See application file for complete search history.

(56) References Cited

U.S. PATENT DOCUMENTS

| | | | |
|---|---|---|---|
| 4,948,015 A | 8/1990 | Kawajiri et al. | |
| 5,004,126 A | 4/1991 | Klesius | |
| 5,110,040 A | 5/1992 | Kalberer et al. | |
| 5,564,603 A | 10/1996 | Malmberg | |
| 5,788,100 A | 8/1998 | Sturk | |
| 6,279,789 B1 | 8/2001 | Krall | |
| 6,382,462 B1 | 5/2002 | Ostergaard-Nielsen et al. | |
| 7,886,922 B2 | 2/2011 | Seelhofer | |
| 10,040,597 B2 * | 8/2018 | Martini | B65D 5/749 |
| 10,196,178 B2 * | 2/2019 | Martini | B65D 41/0485 |
| 10,414,551 B2 * | 9/2019 | Martini | B65D 41/0485 |
| 2001/0054616 A1 | 12/2001 | Ramsey et al. | |
| 2004/0200837 A1 | 10/2004 | Von Spreckelsen et al. | |
| 2007/0007229 A1 | 1/2007 | Yousif | |
| 2009/0039084 A1 | 2/2009 | Casale et al. | |
| 2010/0140271 A1 | 6/2010 | Benedetti et al. | |
| 2012/0228339 A1 | 9/2012 | Kaneko | |
| 2015/0274387 A1 | 10/2015 | Torrent Ortega | |
| 2016/0167849 A1 | 6/2016 | Isogai et al. | |
| 2016/0244224 A1 | 8/2016 | Isogai et al. | |
| 2016/0288967 A1 | 10/2016 | Isogai | |
| 2016/0325471 A1 | 11/2016 | Martini et al. | |
| 2018/0327146 A1 * | 11/2018 | Martini | B65D 41/0485 |

FOREIGN PATENT DOCUMENTS

| | | |
|---|---|---|
| EP | 2 508 432 A1 | 10/2012 |
| JP | 3046081 U | 11/1997 |
| JP | 2007-238140 A | 9/2007 |

OTHER PUBLICATIONS

Written Opinion (PCT/ISA/237) dated Feb. 12, 2015, by the Japanese Patent Office as the International Searching Authority for International Application No. PCT/EP2014/075472.

Office Action issued by the Japanese Patent Office dated Jan. 15, 2018 in corresponding Japanese Patent Application No. 2016-542162, with English translation (8 pages).

* cited by examiner

OPENING DEVICE FOR A CONTAINER AND A METHOD FOR PRODUCING SUCH OPENING DEVICE

CROSS REFERENCE TO RELATED APPLICATIONS

This application is a continuation of U.S. application Ser. No. 15/107,695 filed on Jun. 23, 2016, which is a national stage of International Application No. PCT/EP2014/075472 filed on Nov. 25, 2014, and claims priority to European Application No. 13199500.3 filed on Dec. 23, 2013, the entire content of all three of which is incorporated herein by reference.

TECHNICAL FIELD

The present invention relates to an opening device for a container, in particular for a sealed container for packaging pourable food products, and to a method for producing such opening device.

More specifically, the present invention relates to an opening device designed to be directly applied onto a sheet packaging material, in turn adapted to be folded, filled with a pourable food product and sealed to form a finished container; the present invention is also specifically directed to a method for producing the above opening device applied onto a multilayer sheet packaging material.

BACKGROUND DISCUSSION

As known, many pourable food products, such as fruit juice, UHT (ultra-high-temperature treated) milk, wine, tomato sauce, etc., are sold in containers made of sterilized sheet packaging material.

A typical example of this type of container is the parallelepiped-shaped container for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material, and a number of lamination layers of heat-sealable plastic material, e.g. polyethylene films, covering both sides of the base layer.

In the case of aseptic containers for long-storage products, such as UHT milk, the packaging material also comprises a layer of gas-barrier material, e.g. aluminium foil or ethyl vinyl alcohol (EVOH) film, which is superimposed on a layer of heat-sealable plastic material, and is in turn covered with another layer of heat-sealable plastic material forming the inner face of the container eventually contacting the food product.

Containers of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web of packaging material so sterilized is then maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, containers.

Alternatively, the packaging material may be cut into blanks, which are formed into containers on forming spindles, and the containers are filled with the food product and sealed. One example of this type of container is the so-called "gable-top" container known by the trade name Tetra Rex (registered trademark).

To open the containers described above, various solutions have been proposed, including reclosable opening devices made of plastic material and substantially comprising a pouring spout, defining a through pouring opening and fitted to a hole in a wall of the container.

When producing the opening device, the opening of the pouring spout is sealed by a plastic closing element connected integrally to the pouring spout and detachable from it along a smaller-section annular tearable membrane; the closing element extends at the same level as the packaging material so as to seal the hole in the wall of the container.

A removable, e.g. screw or hinged, lid can be fitted to the pouring spout to outwardly closing the latter and allowing closure of the container after the first opening by removing the closing element.

An example of the above-mentioned opening device is shown in EP-A-2508432. In this case, the pouring spout and the closing element are injection molded in one piece directly on the hole formed in the packaging material so as to seal it.

In particular, the portion of the packaging material provided with the hole on which the pouring spout and the closing element are to be formed is placed between two molds in an open configuration. The molds are then displaced towards the packaging material to reach a closed configuration, in which they cooperate with opposite faces of the packaging material and define a closed mold cavity housing the above-mentioned hole. The injection molding operation is performed by injecting the molten plastic material in the mold cavity defined by the molds in the closed configuration. More specifically, the molten plastic material is forced to fill completely the mold cavity so as to form the pouring spout and the closing element.

Subsequently, a lid is fitted to the pouring spout to close the pouring opening at a region thereof different from that closed by the closing element.

In particular, in the position closing the pouring spout, the lid has a lowered end wall inserted within the pouring spout and placed in contact with the closing element. The lid also has a conductive layer in its bottom surface contacting the closing element.

The lid is then welded to the closing element by an induction heating welding operation. In greater details, an electric current is induced in the conductive layer of the lid so as to generate a localized heat adapted to melt the plastic materials of the contacting surfaces which then solidify in a welded condition.

It is also specified that the conductive layer may be provided in the closing element instead of the lid.

The described solution of opening device permits a one-step, low-effort opening of the container by simply raising the lid. During this movement, a pulling action is exerted on the closing element secured to the lid, which is torn from the pouring spout along the smaller-section annular membrane. In particular, the tearing action starts at a given point of the annular membrane and then propagates to the rest of the membrane up to produce a complete detachment of the closing element from the pouring spout.

However, the solution disclosed in EP-A-2508432 has the drawback that the induction heating welding operation is performed too close to the packaging material with some concerns as to the integrity of the latter. In particular, in order to avoid any possible damage to the packaging material in the zone adjacent to the opening device, it is necessary to control and to limit the pressure and the temperature reached during the welding operation. As a matter of fact, the electromagnetic energy generated by the induction process is partially transferred to the packaging material in the form of heat, which may produce damages to the packaging material itself.

Due to the temperature and pressure limitations, the time necessary to perform the welding operation is relatively high and cannot be reduced without increasing the risks of producing possible damages to the packaging material or reducing the quality of the welding.

SUMMARY

Disclosed here is an opening device for a container, which is able to overcome the aforementioned drawback.

According to one aspect, a closure for an opening device of a container includes a lid configured to be fitted to a pouring spout of the opening device and welding promoting means for connecting the lid to a closing element of the opening device. The lid comprises an end wall and a cylindrical lateral wall projecting from the end wall, with the cylindrical lateral wall surrounding an interior space in the lid. The end wall possesses an end surface facing toward the interior space of the lid, and the welding promoting means comprises a welding promoting element distinct from the lid and permanently connected to the end surface of the end wall of the lid.

In accordance with another aspect, a closure for an opening device of a container comprises a lid configured to be fitted to a pouring spout of the opening device and a welding promoting element that is weldable to a closing element of the opening device. The lid comprises a cylindrical lateral wall and an end wall completely closing one end of the cylindrical lateral wall, with the cylindrical lateral wall projecting axially from the end wall and surrounding an interior space in the lid, and at least a portion of the cylindrical lateral wall being threaded to threadably engage a thread on a neck of pouring spout of the container. The end wall of the lid possesses an end surface facing toward the interior space of the lid, and the welding promoting element is permanently fixed to the end surface of the end wall. The welding promoting element comprises a conductive material layer possessing opposite surfaces including one surface facing toward the end surface of the end wall and an other surface facing toward the interior space in the lid, with the end wall of the lid covering an entirety of the one surface of the conductive material layer. The other surface of the conductive material layer is covered by a heat-sealable plastic material so that upon inducing an electric current in the conductive material layer the closing element may be welded to the heat-sealable plastic material of the welding promoting element.

According to a further aspect, a method for producing a closure for an opening device of a container comprises: providing a lid configured to be fitted to a pouring spout of the opening device, wherein the lid comprises an end wall and a cylindrical lateral wall projecting from the end wall so that the cylindrical lateral wall surrounds an interior space in the lid. The end wall of the lid possesses an end surface facing toward the interior space of the lid. The method additionally involves providing a welding promoting element configured to connect the lid to a closing element of the opening device, wherein the welding promoting element is distinct from the lid; inserting the welding promoting element in the lid so that the welding promoting element faces the end surface of the end wall; and permanently connecting the welding promoting element to the end surface of the end wall of the lid.

BRIEF DESCRIPTION OF DRAWING FIGURES

A preferred, non-limiting embodiment of the present invention will be described by way of example with reference to the accompanying drawings, in which.

DETAILED DESCRIPTION

Number 1 in FIGS. 1, 3, 4 and 8 indicates as a whole a reclosable opening device for a container 100, in particular a sealed container for packaging pourable food products.

Figure 1:
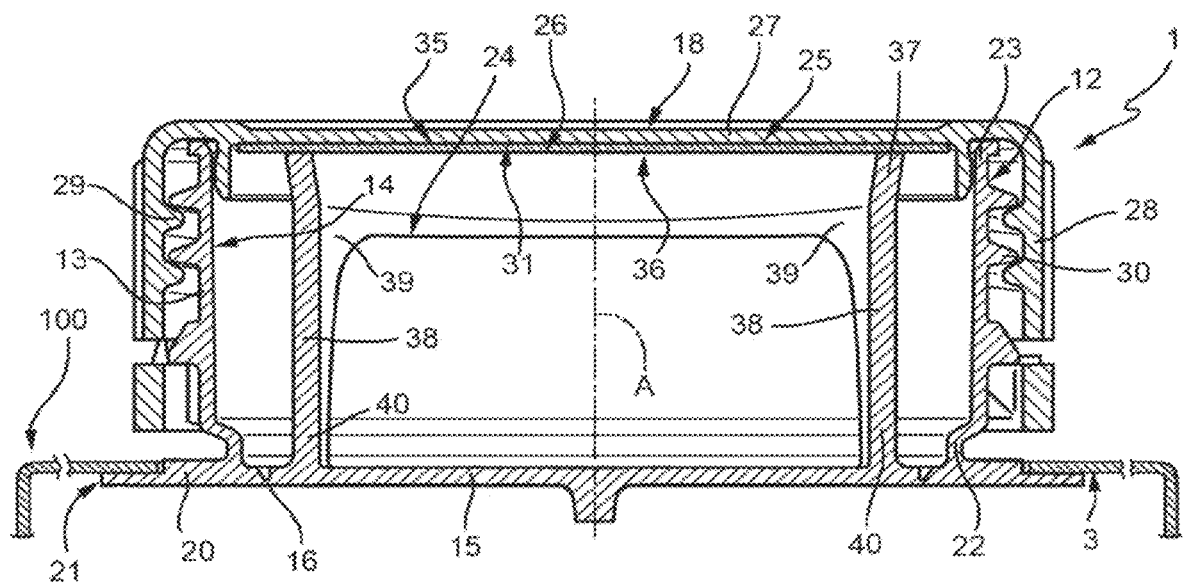
FIG. 1 shows an axial section of an opening device according to the present invention, applied on a sectioned receiving portion of a sheet packaging material forming a container.
Figure 8:
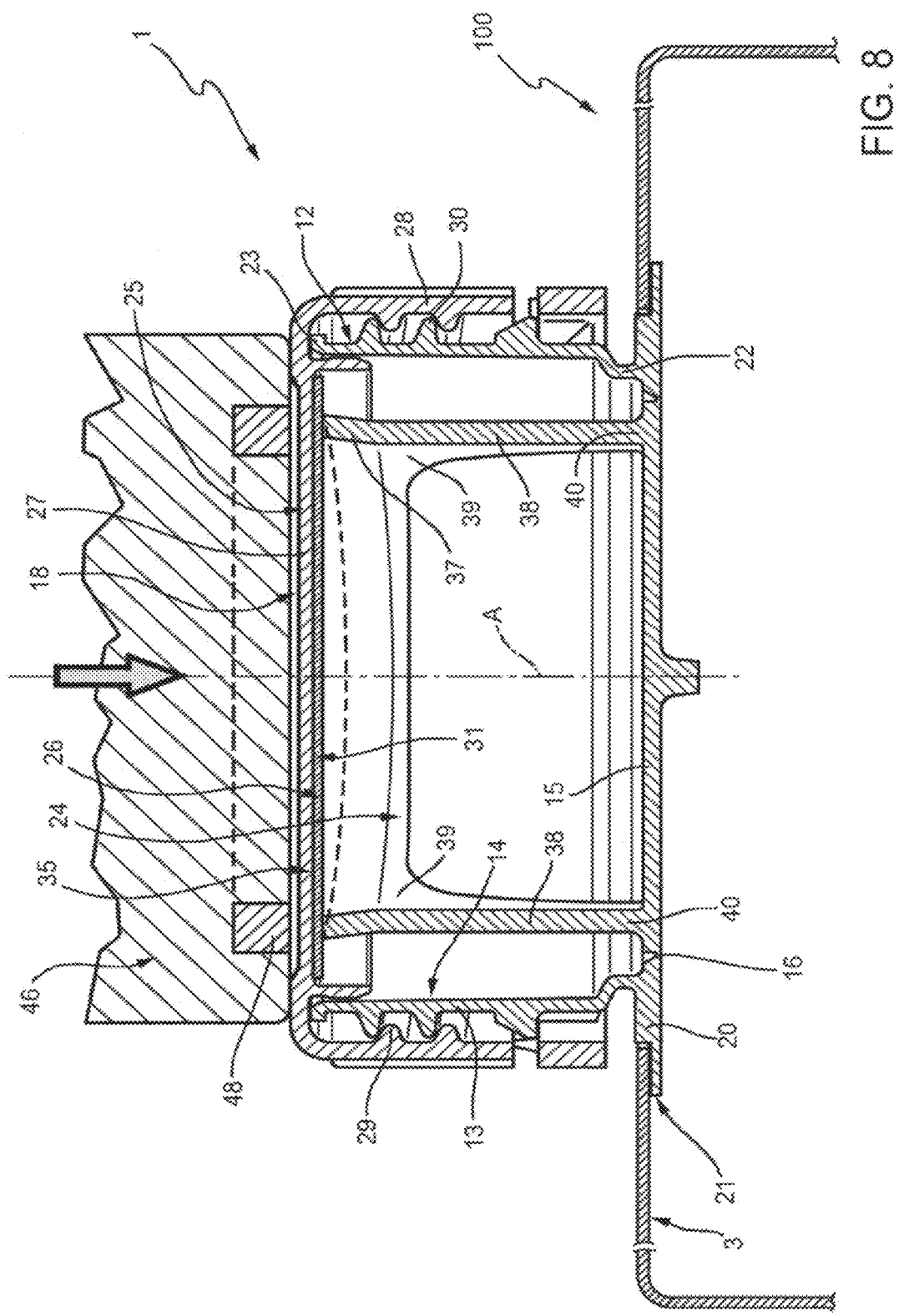
FIG. 8 is analogous to FIG. 1 and shows the container provided with the opening device during a final step of the method for producing the latter.

In the example shown in FIGS. 1 and 8, opening device 1 is applied to a receiving portion 2 of a multilayer sheet packaging material 3, in turn folded, filled with a pourable food product and sealed in a known manner to form container 100.

Figure 2:
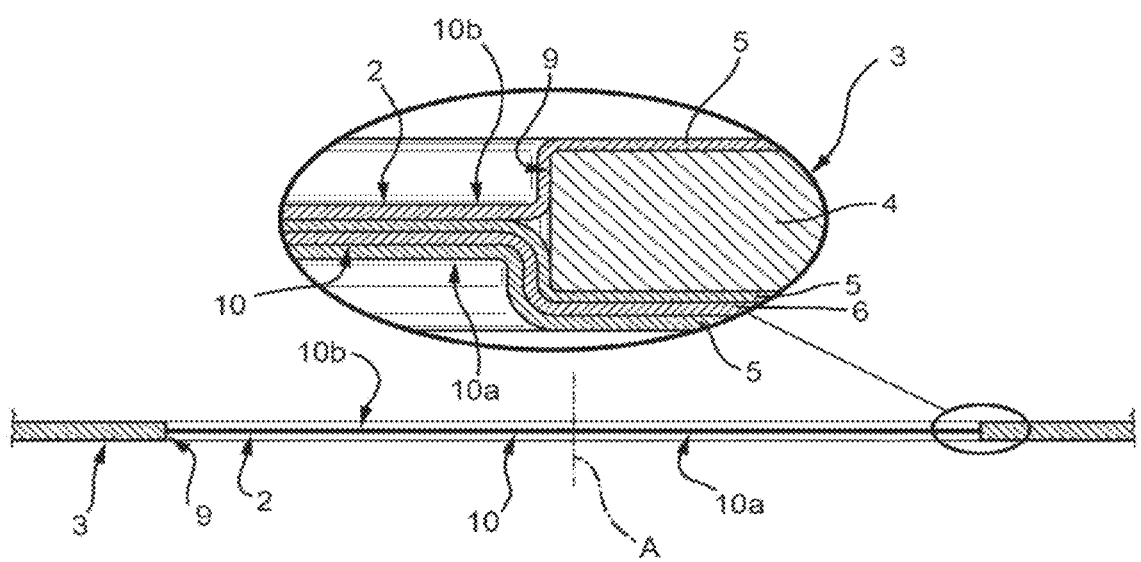
FIG. 2 shows a larger-scale section of the FIG. 1 sheet packaging material before the opening device is applied thereto.
Figure 3:
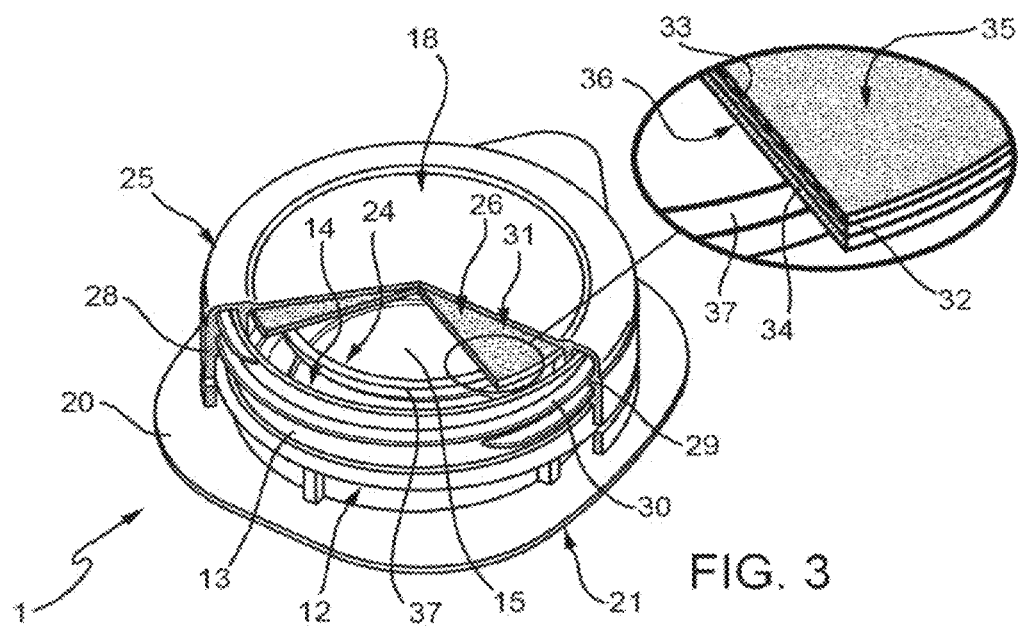
FIG. 3 shows a smaller-scale, partly-sectioned, perspective view of the FIG. 1 opening device.
Figure 4:
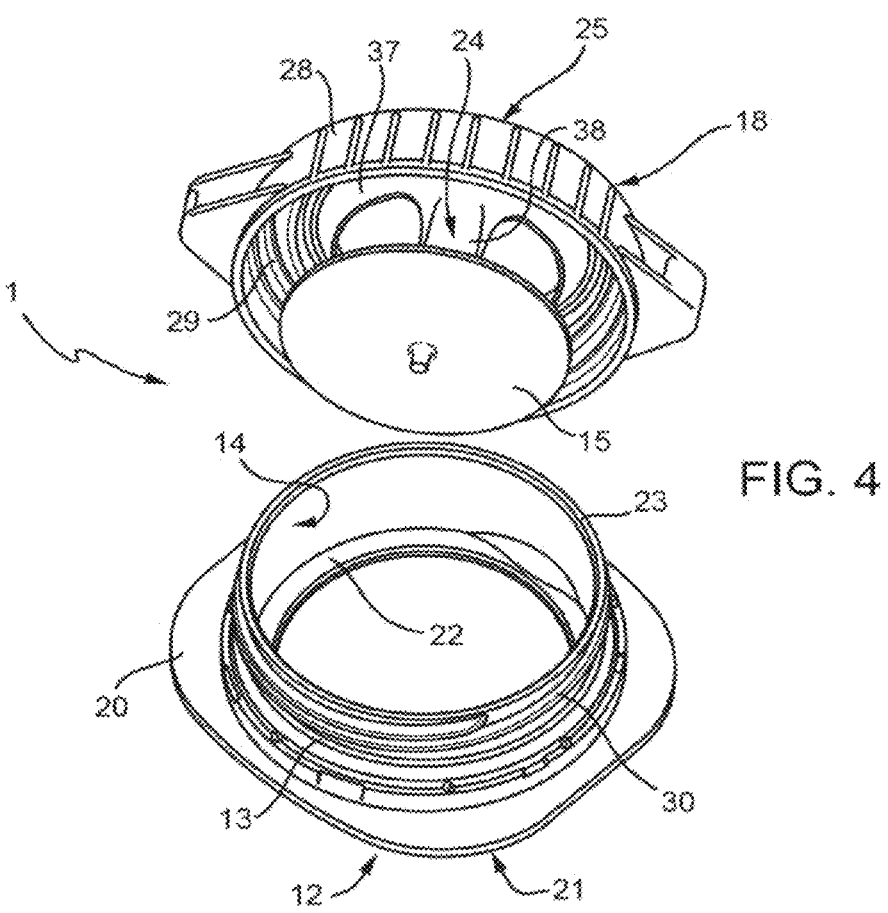
FIG. 4 shows a smaller-scale perspective view of the FIG. 1 opening device in an open condition.
Figure 5:
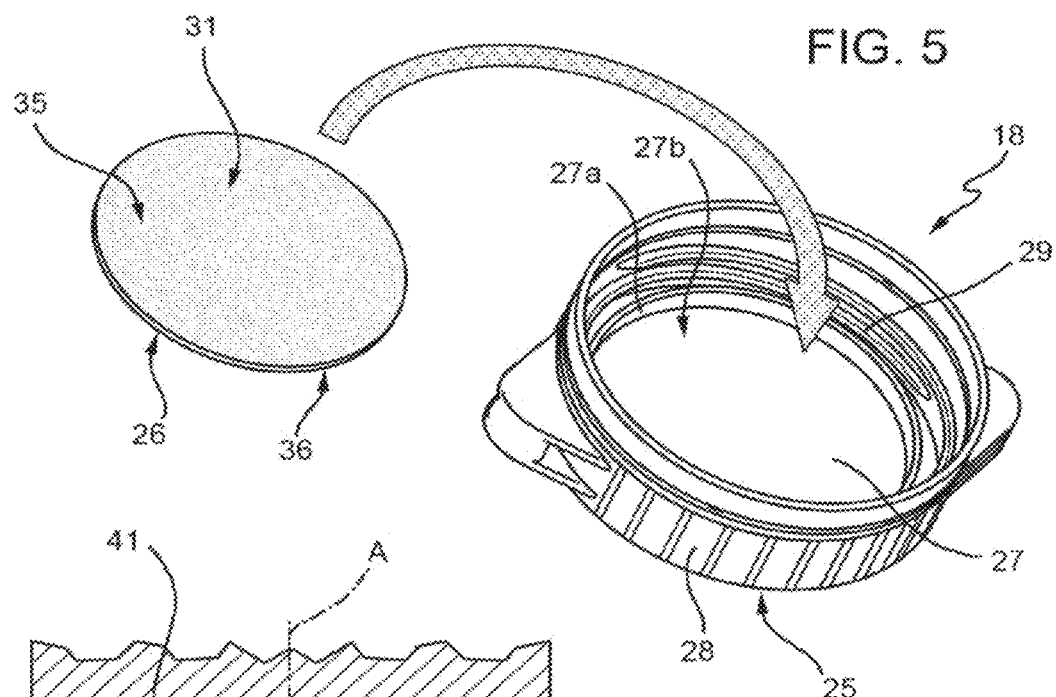
FIG. 5 shows a smaller-scale perspective view of a closure of the FIG. 1 opening device during a step for producing the closure itself.
Figure 6:
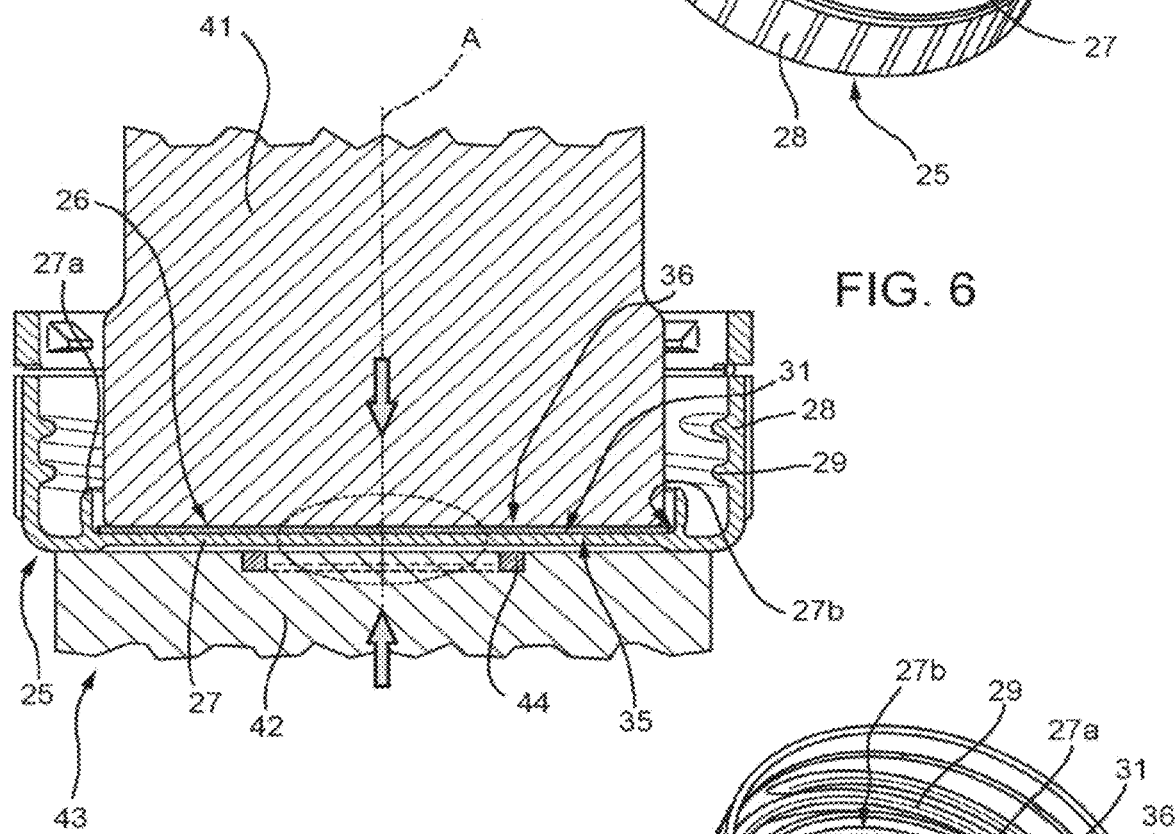
FIG. 6 shows a larger-scale axial section of the FIG. 5 closure during another step for producing it.
Figure 7:
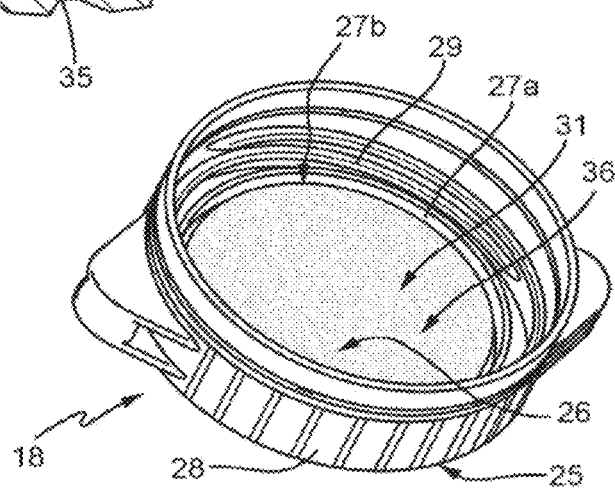
FIG. 7 shows a perspective view of the FIG. 5 closure after its production.

With particular reference to FIG. 2, packaging material 3 comprises a base layer 4 for stiffness and strength, which may be made of fibrous material, e.g. paper, or mineral-filled polypropylene material, and a plurality of layers 5 of heat-sealable plastic material, e.g. polyethylene films, covering both sides of base layer 4.

In the case of an aseptic container for long-storage products, such as UHT milk, packaging material 3 also comprises a layer 6 of gas-barrier material, e.g. aluminium foil or ethyl vinyl alcohol (EVOH) film, which is superimposed on a layer 5 of heat-sealable plastic material, and is in turn covered with another layer 5 of heat-sealable plastic material forming the inner face of the container eventually contacting the food product.

In other words, layers 5 and 6 define respective lamination layers applied to base layer 4 when producing packaging material 3 in the form of a continuous strip.

In the example shown, receiving portion 2 is defined by a so-called pre-laminated hole, i.e. a hole 9 formed through base layer 4 of packaging material 3 and covered by lamination layers 5, 6, so that hole 9 is sealed by a sheet cover portion 10.

In a possible alternative embodiment not shown, cover portion 10 may even be defined by only one or some of layers 5, 6. For example, cover portion 10 may be made solely of gas-barrier material.

In another possible alternative embodiment not shown, cover portion 10 may be defined by a patch fixed to the rest of packaging material 3 to seal a hole formed, in this case, through the full thickness of such packaging material 3.

In a further alternative embodiment not shown, receiving portion 2 may be simply defined by a hole formed through the full thickness of the packaging material 3 and which is destined to be sealed by opening device 1.

With reference to FIGS. 1, 3, 4 and 8, opening device 1 has an axis A, which in use is substantially perpendicular to receiving portion 2 of packaging material 3; opening device 1 basically comprises:

- a pouring spout 12 fixed to packaging material 3 at hole 9 and having a cylindrical tubular neck 13 of axis A, defining a pouring opening 14, by which to pour in use the content of the container;
- a closing element 15 closing or sealing pouring opening 14 and integrally connected to pouring spout 12 by a smaller-section, annular membrane 16 adapted to be easily torn in use; and
- a closure 18 fitted to neck 13 of pouring spout 12 in a removable manner to close or seal pouring opening 14 at a region thereof different from that closed by closing element 15.

Annular membrane 16 defines a tear line along which to detach in use closing element 15 from pouring spout 12.

According to a preferred embodiment of the present invention, pouring spout 12 and closing element 15 are formed in one piece on receiving portion 2 of packaging material 3, whilst closure 18 is formed separately from pouring spout 12 and closing element 15 and then fitted thereto.

In the solution disclosed in the FIGS. 1 to 4 and 8, pouring spout 12 and closing element 15 are obtained by molding molten plastic material—in particular by an injection molding operation—on the packaging material 3 before it is transformed in container 100.

More specifically, the plastic material destined to form pouring spout 12 and closing element 15 is injected in a molten state onto one side 10a—i.e. the side eventually facing inwards of the final container—of cover portion 10 placed in a known manner within a molding apparatus (known per se and not shown). In particular, the molten plastic material covers side 10a of cover portion 10 up to an annular peripheral region thereof so as to form, in this way, the closing element 15 directly attached to the cover portion 10; the molten plastic material is then forced to pierce cover portion 10 at such annular peripheral region to form pouring spout 12 projecting from an opposite side 10b of the cover portion 10 and attached to closing element 15 through smaller-section annular membrane 16, which is in turn adapted to be torn by the user to open the container.

In this way, the material forming the pre-laminated hole is first pierced through and then resealed by the plastic material forming the pouring spout 12.

In practice, neck 13 of pouring spout 12 extends through cover portion 10 as a follow-on from the piercing thereof so as to be arranged on both sides 10a, 10b of the cover portion 10 itself.

Closing element 15 and cover portion 10 of hole 9 together define a sealing portion sealing pouring opening 14 of pouring spout 12. Closing element 15 substantially has a confetti shape.

According to a possible alternative not shown, the plastic material destined to form pouring spout 12 and closing element 15 may be also directly injected in a molten state through a hole of the packaging material 3 so that such hole is then completely sealed by closing element 15 only.

As shown particularly in FIGS. 1, 3, 4 and 8, pouring spout 12 further comprises an annular flange 20 fixed to packaging material 3 at the edge of hole 9; neck 13 projects axially and integrally from an annular region of flange 20 radially interposed between an outer edge 21 of the flange 20 itself and annular membrane 16.

In practice, closing element 15 defines a prolongation of flange 20 inside pouring spout 12 and closes or seals one axial end 22 of the pouring spout 12; in a different manner, closure 18 seals the opposite axial end 23 of pouring spout 12, even after removal in use of closing element 15 and cover portion 10.

Closing element 15 is advantageously formed in one piece with a protruding portion 24 extending through pouring opening 14 and welded to closure 18 far away from the closing element 15. In other words, protruding portion 24 is welded to closure 18 at a given, not null, axial distance from closing element 15.

With reference to FIGS. 1 and 3 to 8, closure 18 basically comprises a lid 25 and a disk-shaped welding promoting element 26 to connect the lid 25 to protruding portion 24.

In particular, lid 25 comprises a disk-shaped end wall 27, closing pouring opening 14 of pouring spout 12 at end 23 thereof, and a cylindrical lateral wall 28 cooperating with the outer surface of neck 13 of pouring spout 12.

In the example shown, lid 25 is of a screw type and lateral wall 28 has an inner thread 29, which engages a corresponding outer thread 30 on neck 13 of pouring spout 12.

Lid 25 further comprises integrally an annular rib 27a axially protruding from end wall 27 towards the inside of the lid 25 itself and defining a seat 27b for receiving welding promoting element 26.

As visible in FIGS. 1, 3, 5, 6, 7 and 8, welding promoting element 26 is defined by a multilayer sheet element 31 distinct from lid 25 and permanently connected to the lid 25.

In particular (FIG. 3), sheet element 31 comprises a layer 32 of conductive material, e.g. an aluminum foil, and at least two layers 33, 34 of heat-sealable plastic material, e.g. polyethylene films, covering both sides of layer 32 and defining respective opposite faces 35, 36.

In the example shown, face 35 of sheet element 31 is configured to be welded to end wall 27 by the heat generated by inducing an electric current in layer 32; in an analogous manner, face 36 of sheet element 31 is configured to be welded to protruding portion 24 by the heat generated by inducing an electric current in layer 32.

As shown in FIGS. 1, 3, 4 and 8, protruding portion 24 comprises an annular body 37, welded to face 36 of sheet element 31, and two legs 38 integrally connecting annular body 37 to closing element 15. In particular, legs 38 have first ends 39, integrally connected to respective diametrically opposite portions of annular body 37 with respect to axis A, and second ends 40 integrally connected to closing element 15.

As a possible alternative not shown, legs 38 may be also not diametrically opposite one another.

As a further possible alternative not shown, protruding portion 24 may comprise more than two legs 38 angularly spaced from each other.

Opening device 1 is produced as follows.

First of all, pouring spout 12 and closing element 15 are injection molded in one piece onto receiving portion 2 of packaging material 3.

In particular, the packaging material 3 is placed with receiving portion 2 inside a molding apparatus; at this point, the molten plastic material is injected onto side 10*a* of cover portion 10 and flows along it up to the annular peripheral region thereof so as to form, in this way, the closing element 15 directly attached to the cover portion 10; the molten plastic material is then forced to pierce cover portion 10 at such annular peripheral region to form pouring spout 12 projecting from side 10*b* of the cover portion 10 and attached to closing element 15 through smaller-section annular membrane 16. In practice, the material forming cover portion 10 is first pierced through and then resealed by the plastic material forming the pouring spout 12.

At this point, packaging material 3 is sterilized and then folded, filled with a pourable food product and sealed in a known manner to obtain container 100.

Closure 18 is produced separately from pouring spout 12 and closing element 15 and then fitted thereto.

In particular, after forming lid 25 and sheet element 31 in known manner, the latter is inserted into seat 27*b* of the lid 25 with face 35 in contact with end wall 27. The assembly so formed is then inserted between a pressure element 41 and an electric induction generating element 42 of an induction heating welding apparatus 43. More specifically, in the example shown in FIG. 6, the pressure element 41 also engages seat 27*b* of lid 25 and cooperates with face 36 of sheet element 31; electric induction generating element 42 comprises a coil 44 and cooperates with an external surface of end wall 27 of lid 25 opposite the surface of the end wall 27 itself cooperating with sheet element 31.

By activating coil 44, an electric current is induced in layer 32 of conductive material of sheet element 31, with a consequent generation of localized heat producing the welding of the face 35 of heat-sealable plastic material to end wall 27 of lid 25.

Closure 18 is then fitted to pouring spout 12 of container 100 with reciprocal engagement of threads 29 and 30.

At this point, container 100 with opening device 1 cooperates with an electric induction generating element 46 (see FIG. 8). More specifically, electric induction generating element 46 is similar to electric induction generating element 42 and comprises a coil 48; electric induction generating element 46 cooperates with the external surface of end wall 27 of lid 25 opposite the surface of the end wall 27 itself cooperating with sheet element 31.

By activating coil 48, an electric current is induced in layer 32 of conductive material of sheet element 31, with a consequent generation of localized heat producing the welding of the face 36 of heat-sealable plastic material to annular body 37 of protruding portion 24.

This induction heating welding operation is performed at a distance, non null, along axis A from closing element 15 and, therefore, from adjacent packaging material 3, with no risk to damage it.

According to a possible alternative not shown, closure 18 may be fitted to pouring spout 12 and welded to protruding portion 24 of closing element 15 by an induction heating welding operation carried out directly on the packaging material 3 in the form of a web, i.e. before such packaging material 3 is transformed in the finished container 100.

In actual use, the first opening of the container is obtained by rotating lid 25 with respect to pouring spout 12 about axis A. At the beginning of the rotation impressed by the user on lid 25, legs 38 bend in the direction of rotation, so exerting a pulling action on closing element 15 at a given point of the annular membrane 16; in other words, due to the presence of the bending legs 38, the torque exerted on lid 25 is transformed in a pulling action on closing element 15, which starts to detach from pouring spout 12 at two given points along annular membrane 16.

By continuing to rotate lid 25, it unscrews completely from pouring spout 12 together with closing element 15, which remains attached to the lid 25 (see FIG. 4) and therefore fully detaches along annular membrane 16 from the pouring spout 12 itself.

The advantages of the opening device 1, the closure 18 and the methods for producing them according to the present invention will be clear from the foregoing description.

In particular, thanks to the fact that closing element 15 is formed in one piece with protruding portion 24, in turn extending through pouring opening 14, the welding operation to connect the closing element 15 to lid 25 can be performed far away from the packaging material 3, without any risk to damage it. This also permits to have fewer constraints as to the parameters (temperature, power, pressure, etc.) used in the welding operation, with possible reduction of the time necessary to perform it.

In addition, the use of a screw-type lid 25 in combination with a protruding portion 24, including two or more legs 38 connecting sheet element 31 to closing element 15, permits to transform the twisting action on the lid 25 in a pulling action on the closing element 15, with a strongly reduced effort for the user with respect to similar twisting known solutions. As a matter of fact, at the beginning of the rotation impressed by the user on lid 25, legs 38 bend in the direction of rotation, so producing a pulling action on closing element 15 at a given point of the annular membrane 16; this causes an initial detachment of the closing element 15 from the pouring spout 12 at two points of annular membrane 16 instead of requiring the same detachment along the entire annular membrane 16 simultaneously; the result is a reduced effort experienced by the user during the initial unsealing of closure 18 from pouring spout 12.

Clearly, changes may be made to opening device 1, closure 18 and the methods for producing them as described herein without, however, departing from the scope of protection as defined in the accompanying Claims.

The invention claimed is:

1. A closure for an opening device of a container, the closure comprising a lid configured to be fitted to a pouring spout of the opening device, and welding promoting means for connecting the lid to a closing element of the opening device, the lid comprising an end wall and a cylindrical lateral wall projecting from the end wall, the cylindrical lateral wall surrounding an interior space in the lid, the end wall possessing an end surface facing toward the interior space of the lid, the welding promoting means comprise a welding promoting element distinct from the lid and permanently connected to the end surface of the end wall of the lid.

2. The closure as claimed in claim 1, wherein the cylindrical lateral wall projecting from the end wall of the lid possesses an inner surface facing the interior space in the lid, the inner surface of cylindrical lateral wall includes an interior thread that is threadably engageable with an outer thread on a neck of pouring spout of the container.

3. The closure as claimed in claim 1, wherein the lid includes an annular rib that is integral with the end surface of the end wall, the annular rib extending entirely axially towards the interior space in the lid, the annular rib surrounding a seat at which is positioned the welding promoting element.

4. The closure as claimed in claim 3, wherein the annular rib is positioned radially inwardly of the cylindrical lateral wall so that the cylindrical lateral wall surrounds the annular rib.

5. The closure as claimed in claim 1, wherein the welding promoting element comprises a sheet element including a layer of conductive material and having:
a first face configured to be welded to the closing element of the opening device by heat generated by inducing an electric current in the layer of conductive material; and
a second face opposite the first face and welded to the end surface of the end wall of the lid of the opening device by heat generated by inducing an electric current in the layer of conductive material.

6. The closure as claimed in claim 5, wherein the sheet element further comprises a first and a second layer of heat-sealable plastic material arranged on opposite sides of the layer of conductive material, the first layer of heat-sealable plastic material defining the first face, and the second layer of heat-sealable plastic material defining the second face.

7. The closure as claimed in claim 5, wherein the first face of the sheet element is completely exposed to the interior space in the lid.

8. A closure for an opening device of a container, the closure comprising a lid configured to be fitted to a pouring spout of the opening device and a welding promoting element that is weldable to a closing element of the opening device, the lid comprising a cylindrical lateral wall and an end wall completely closing one end of the cylindrical lateral wall, the cylindrical lateral wall projecting axially from the end wall and surrounding an interior space in the lid, at least a portion of the cylindrical lateral wall being threaded to threadably engage a thread on a neck of pouring spout of the container, the end wall of the lid possessing an end surface facing toward the interior space of the lid, the welding promoting element being permanently fixed to the end surface of the end wall, the welding promoting element comprising a conductive material layer possessing opposite surfaces including one surface facing toward the end surface of the end wall and an other surface facing toward the interior space in the lid, the end wall of the lid covering an entirety of the one surface of the conductive material layer, the other surface of the conductive material layer being covered by a heat-sealable plastic material so that upon inducing an electric current in the conductive material layer the closing element may be welded to the heat-sealable plastic material of the welding promoting element.

9. The closure as claimed in claim 8, wherein the cylindrical lateral wall possesses an inner surface facing the interior space in the lid, the portion of the cylindrical lateral wall that is threaded being the inner surface of the cylindrical lateral wall.

10. The closure as claimed in claim 9, wherein the lid includes an annular rib that is integral with the end surface of the end wall, the annular rib extending entirely axially towards the interior space in the lid, the annular rib surrounding a seat at which is positioned the welding promoting element.

11. The closure as claimed in claim 10, wherein the annular rib is positioned radially inwardly of the cylindrical lateral wall so that the cylindrical lateral wall surrounds the annular rib.

12. A method for producing a closure for an opening device of a container, the method comprising:
providing a lid configured to be fitted to a pouring spout of the opening device, the lid comprising an end wall and a cylindrical lateral wall projecting from the end wall, the cylindrical lateral wall surrounding an interior space in the lid, the end wall possessing an end surface facing toward the interior space of the lid;
providing a welding promoting element configured to connect the lid to a closing element of the opening device, the welding promoting element that is distinct from the lid;
inserting the welding promoting element in the lid so that the welding promoting element faces the end surface of the end wall; and
permanently connecting the welding promoting element to the end surface of the end wall of the lid.

13. The method as claimed in claim 12, wherein the welding promoting element comprises a sheet element including a layer of conductive material; and the permanently connecting of the welding promoting element to the end surface of the end wall of the lid is performed by inducing an electric current in the layer of conductive material to produce a localized heat adapted to weld a face of the sheet element to the end surface of the end wall of the lid.

14. The method as claimed in claim 12, wherein the end wall of the lid is a non-apertured end wall so that the end wall forms a completely closed end of the lid.

15. The method as claimed in claim 12, wherein the end wall of the lid to which the welding promoting element is permanently connecting includes an annular rib axially protruding from the end wall toward the interior space of the lid, the annular rib being positioned inwardly of the cylindrical lateral wall and surrounding a seat, the permanent connection of the welding promoting element to the end surface of the end wall of the lid comprising permanently connecting the welding promoting element to the end surface of the end wall so that the welding promoting element is located at the seat.

16. The closure as claimed in claim 12, further comprising an annular rib axially protruding from the end wall of the lid toward the interior space of the lid, the annular rib being positioned inwardly of the cylindrical lateral wall, the annular rib surrounding a seat at which is located the welding promoting element.

17. The method as claimed in claim 16, wherein the end wall of the lid to which the welding promoting element is permanently connecting is a non-apertured end wall so that the end wall forms a completely closed end of the lid.

* * * * *